US012756042B2

(12) United States Patent
Yu

(10) Patent No.: US 12,756,042 B2
(45) Date of Patent: Oct. 6, 2026

(54) SECONDARY SEALING DEVICE FOR POUCH-TYPE SECONDARY BATTERY

(71) Applicant: LG Energy Solution, Ltd., Seoul (KR)

(72) Inventor: Cheol Jin Yu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 490 days.

(21) Appl. No.: 18/560,805

(22) PCT Filed: Jan. 20, 2023

(86) PCT No.: PCT/KR2023/000992
§ 371 (c)(1),
(2) Date: Nov. 14, 2023

(87) PCT Pub. No.: WO2023/140675
PCT Pub. Date: Jul. 27, 2023

(65) Prior Publication Data
US 2024/0291084 A1 Aug. 29, 2024

(30) Foreign Application Priority Data
Jan. 24, 2022 (KR) ........................ 10-2022-0010095

(51) Int. Cl.
*H01M 50/186* (2021.01)
*H01M 10/04* (2006.01)
*H01M 50/105* (2021.01)

(52) U.S. Cl.
CPC ..... *H01M 50/186* (2021.01); *H01M 10/0404* (2013.01); *H01M 50/105* (2021.01)

(58) Field of Classification Search
CPC .. H01M 50/186; H01M 50/105; H01M 10/04; H01M 10/0404
See application file for complete search history.

(56) References Cited

U.S. PATENT DOCUMENTS

2010/0028772 A1* 2/2010 Yang .................. H01M 50/578 429/185
2018/0047950 A1 2/2018 Lim et al.

FOREIGN PATENT DOCUMENTS

| | | | |
|---|---|---|---|
| CN | 113131003 | A | 7/2021 |
| EP | 3565050 | A1 | 11/2019 |
| EP | 3444710 | B1 | 3/2021 |
| JP | H10199561 | A | 7/1998 |
| JP | 2015220199 | A | 12/2015 |
| JP | 2016122493 | A | 7/2016 |
| KR | 20130044705 | A | 5/2013 |

(Continued)

OTHER PUBLICATIONS

International Search Report for PCT/KR2023/000992 mailed May 4, 2023. 2 pages.

(Continued)

*Primary Examiner* — Stewart A Fraser
(74) *Attorney, Agent, or Firm* — Lerner David LLP

(57) ABSTRACT

The present application relates to a secondary sealing device for a pouch-type secondary battery. The secondary sealing device for a pouch-type secondary battery pursuant to the present invention can align the position of the electrode assembly to perform correction for a gap between the electrode assembly and the secondary sealing line allowing for convenient and precise gap management and ensuring consistent product specifications in terms of electrical characteristics.

12 Claims, 5 Drawing Sheets

(56) References Cited

FOREIGN PATENT DOCUMENTS

| | | | |
|---|---|---|---|
| KR | 20160118931 | A | 10/2016 |
| KR | 20170019211 | A | 2/2017 |
| KR | 20180060821 | A | 6/2018 |
| KR | 20180093792 | A | 8/2018 |
| KR | 20200118991 | A | 10/2020 |
| WO | 2017179310 | A1 | 10/2017 |

OTHER PUBLICATIONS

Extended European Search Report including Written Opinion for Application No. 23743519.3 dated Sep. 18, 2025. 10 pages.

* cited by examiner

[Figure 1]
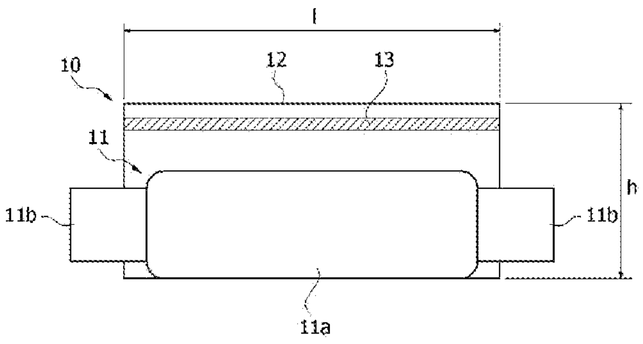
[Figure 2]
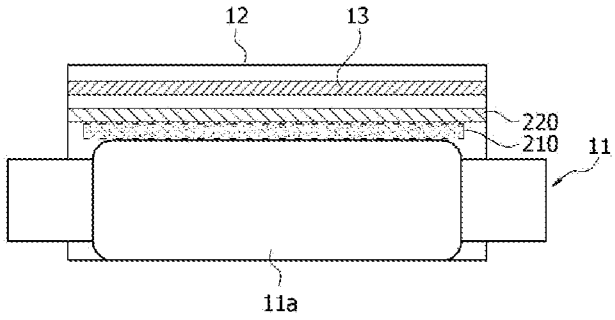
[Figure 3]
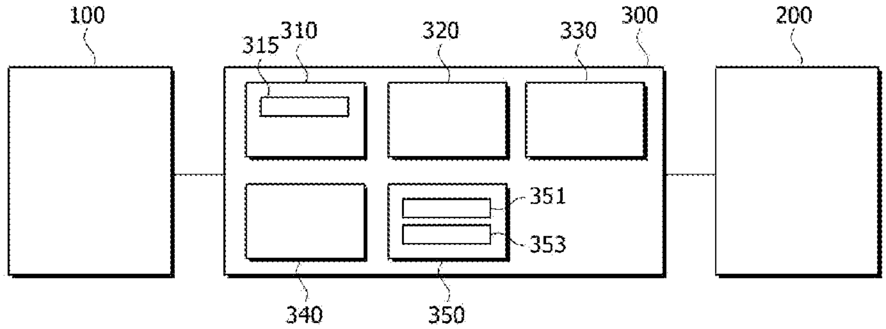

[Figure 4]
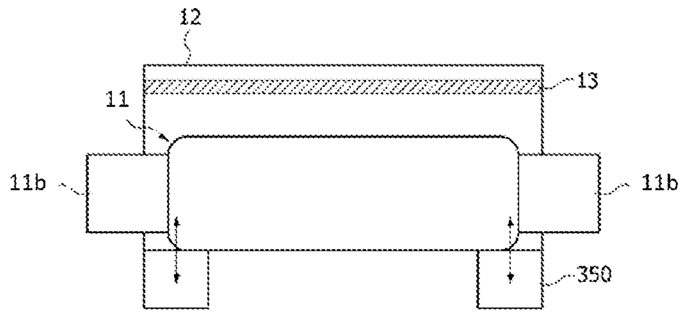
[Figure 5]
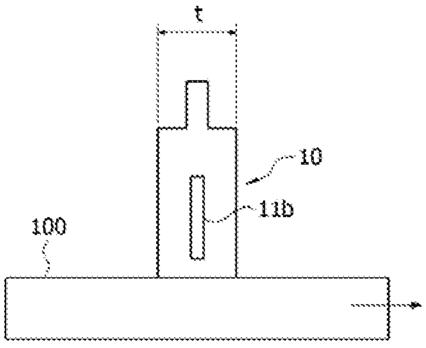

[Figure 6A]
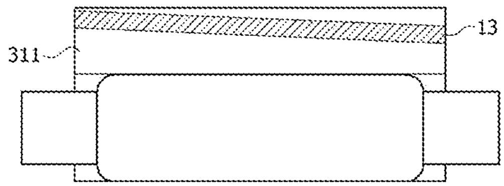
[Figure 6B]
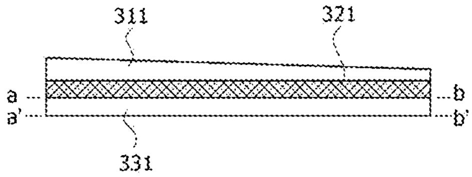
[Figure 6C]
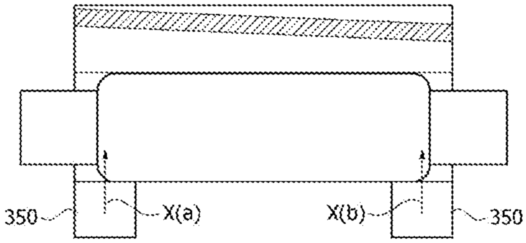

[Figure 7A]
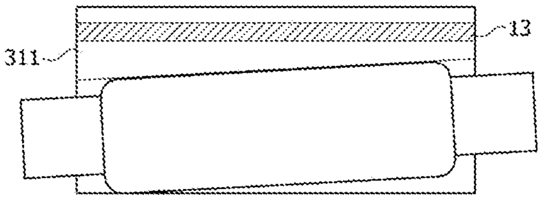
[Figure 7B]
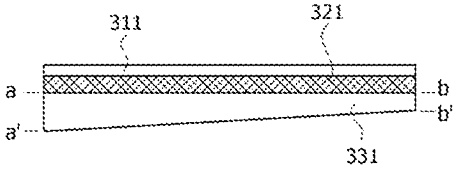
[Figure 7C]
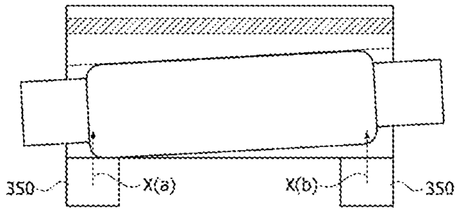

[Figure 8A]
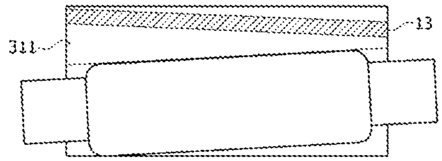
[Figure 8B]
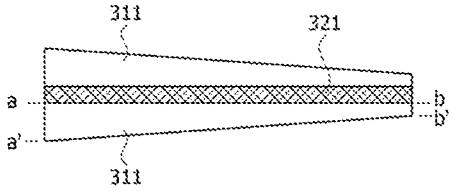
[Figure 8C]
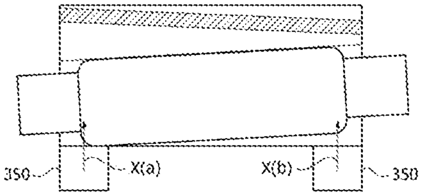
[Figure 9]
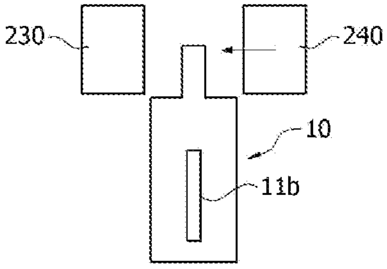

SECONDARY SEALING DEVICE FOR POUCH-TYPE SECONDARY BATTERY

CROSS-REFERENCE TO RELATED APPLICATIONS

This application is a national phase entry under 35 U.S.C. § 371 of International Application No. PCT/KR2023/000992 filed on Jan. 20, 2023, which claims the benefit of priority based on Korean Patent Application No. 10-2022-0010095 filed on Jan. 24, 2022, the disclosures of both of which are incorporated herein by reference in their entirety.

TECHNICAL FIELD

The present invention relates to a secondary sealing device for a pouch-type secondary battery, which relates to, more particularly, a secondary sealing device for a pouch-type secondary battery applied to a process of secondarily sealing the pouch-type secondary battery in which an electrolyte injection step, a primary sealing step, a charge and discharge step, and a degassing step are sequentially performed.

BACKGROUND ART

Secondary batteries capable of repeated charging and discharging may be classified into rectangular secondary batteries, cylindrical secondary batteries, pouch-type secondary batteries, and the like, depending on their manufacturing methods and structures. Among them, the pouch-type secondary battery is widely used because of its simple structure and high electric capacity per unit volume.

In general, the pouch-type secondary battery is manufactured by accommodating an electrode assembly, in which an electrode tab is formed on one side of an electrode body comprising a negative electrode, a positive electrode, an electrolyte, and a separator, inside a pouch, and then injecting an electrolyte solution inside the pouch, primarily sealing an electrolyte injection part, and secondarily sealing it after a degassing process of filling and removing gas.

Meanwhile, the secondary sealing is performed by forming a secondary sealing line to form a gap with the electrode assembly inside the primary sealing line.

The gap is a factor that affects electrical characteristics of the battery in subsequent processes, and the gap management is essentially required to maintain constant specifications between products.

DISCLOSURE

Technical Problem

It is a problem to be solved by the present invention to provide a secondary sealing device for a pouch-type secondary battery easy to manage a gap between a secondary sealing line and an electrode assembly.

Technical Solution

In order to solve the above problem, according to one aspect of the present invention, a secondary sealing device for a pouch-type secondary battery comprising an electrode assembly and a pouch-type case, in which a primary sealing line is formed in an electrolyte injection part located at the rim of the pouch-type case, comprising: a transport part transporting the pouch-type secondary battery: a sealing part forming a secondary sealing line to be positioned between the primary sealing line and the electrode assembly in a state of having a predetermined gap with the electrode assembly; and a gap correction part provided to correct the gap in advance by aligning the position of the pouch-type secondary battery before the secondary sealing line is formed in the sealing part is provided.

In addition, according to another aspect of the present invention, a method of secondarily sealing a pouch-type secondary battery comprising steps of: transporting a pouch-type secondary battery comprising an electrode assembly and a pouch-type case, in which a primary sealing line is formed in an electrolyte injection part located at the rim edge of the pouch-type case, to a secondary sealing location: forming a secondary sealing line at the secondary sealing location to have a gap with the electrode assembly inside the primary sealing line; and correcting the gap in advance by aligning the position of the pouch-type secondary battery transported to the secondary sealing location is provided.

Advantageous Effects

As described above, according to the secondary sealing device of the pouch-type secondary battery pursuant to the present invention, it aligns the position of the electrode assembly, whereby it is possible to perform correction for the gap between the electrode assembly and the secondary sealing line, and accordingly the gap management is easy, and it is possible to provide a product having the same specifications in terms of electrical characteristics.

DESCRIPTION OF DRAWINGS

FIG. 1 is a cross-sectional diagram showing a structure of a pouch-type secondary battery in which a primary sealing line is formed.

FIG. 2 is a cross-sectional diagram showing a structure of a pouch-type secondary battery in which a secondary sealing line is formed.

FIG. 3 is a schematic diagram of an exemplary secondary sealing device according to the present invention.

FIG. 4 is a schematic diagram showing an operation of a driving part of the secondary sealing device of FIG. 3 according to an embodiment of the present invention.

FIG. 5 is a schematic diagram showing a transporting direction of an exemplary transport part of the secondary sealing device of FIG. 3 according to the present invention.

FIGS. 6A to 6C are schematic diagrams showing examples of an exemplary gap correction according to the present invention.

FIGS. 7A to 7C are schematic diagrams showing examples of an exemplary gap correction according to the present invention.

FIGS. 8A to 8C are schematic diagrams showing examples of an exemplary gap correction according to the present invention.

FIG. 9 is a schematic diagram showing an operating state of an exemplary sealing part of the secondary sealing device of FIG. 3 according to the present invention.

MODE FOR INVENTION

Hereinafter, a secondary sealing device for a pouch-type secondary battery according to one example of the present invention will be described in detail with reference to the accompanying drawings.

In addition, regardless of the reference numerals, the same or corresponding components are given by the same or similar reference numerals, and duplicate descriptions thereof will be omitted, and for convenience of explanation, the size and shape of each component as shown can be exaggerated or reduced.

The present invention relates to a secondary sealing device for a pouch-type secondary battery comprising an electrode assembly and a pouch-type case, in which a primary sealing line is formed in an electrolyte injection part located at the rim of the pouch-type case.

A secondary sealing device for a pouch-type secondary battery related to one example of the present invention may be a device for secondarily sealing a pouch-type secondary battery that an electrolyte injection process, and charging and discharging, and degassing processes have been performed sequentially.

The first sealing line is formed in a primary sealing process, and the primary sealing process is performed after the electrolyte injection is completed.

FIG. 1 is a cross-sectional diagram showing a structure of a pouch-type secondary battery (10) in which a primary sealing line (13) is formed.

Referring to FIG. 1, the pouch-type secondary battery (10) after the primary sealing process has predetermined length (l), height (h) and thickness (t). In addition, the pouch-type secondary battery (10) comprises an electrode assembly (11), in which an electrode tab (11*b*) is formed on one side of an electrode body (11*a*) including a negative electrode, a positive electrode, an electrolyte and a separator, and a pouch-type case (12) surrounding the electrode assembly (11). At this time, the primary sealing line (13) is formed in the electrolyte injection part located at the rim of the pouch-type case (12).

A secondary sealing device for a pouch-type secondary battery (10) related to one example of the present application is a secondary sealing device for a pouch-type secondary battery (10) comprising an electrode assembly (11) and a pouch-type case (12), in which a primary sealing line (13) is formed in an electrolyte injection part located at the rim of the pouch-type case (12).

In this document, the primary and secondary sealing lines mean bonding lines for sealing the electrode assembly (11) inside the pouch-type case (12), and are formed in the rim part of the pouch-type case (12) to surround the electrode assembly (11).

FIG. 2 is a cross-sectional diagram showing a structure of a pouch-type secondary battery in which a secondary sealing line is formed, and FIG. 3 is a diagram showing a configuration of an exemplary device according to the present invention.

The secondary sealing device for a pouch-type secondary battery related to one example of the present invention comprises a transport part (100) transporting the pouch-type secondary battery: a sealing part (200) forming a secondary sealing line (220) so that the secondary sealing line (220) is positioned between the primary sealing line (13) and the electrode assembly (11), and the secondary sealing line (220) has a predetermined gap (210) with the electrode assembly (11); and a gap correction part (300) provided to correct the gap (210) in advance by aligning the position of the pouch-type secondary battery (10) before the secondary sealing line (220) is formed in the sealing part (200).

FIG. 4 is a diagram showing an operating state of an exemplary driving part according to the present invention, FIG. 5 is a diagram for explaining a transporting direction of an exemplary transport part according to the present invention, FIGS. 6A to 8C are diagrams for explaining examples of exemplary gap correction according to the present invention, and FIG. 9 is a diagram for explaining an operating state of an exemplary sealing part according to the present invention.

The secondary sealing device for the pouch-type secondary battery comprises a transport part (100), a sealing part (200), and a gap correction part (300).

The transport part (100) transports the pouch-type secondary battery (10) to a secondary sealing location. The transport part (100) serves to transport the pouch-type secondary battery that the degassing process has completed to a secondary sealing location. In this instance, the secondary sealing location means a location where the sealing part (200) is provided.

The sealing part (200) forms the secondary sealing line (220) to have the gap (210) with the electrode assembly (11) inside the primary sealing line (13) at the secondary sealing location. The sealing part (200) forms a secondary sealing line (220) to be located between the primary sealing line (13) and the electrode assembly (11) in a state of having a predetermined gap (210) with the electrode assembly (11). That is, the secondary sealing line (220) has a predetermined gap (210) with the electrode assembly (11), and is located between the primary sealing line (13) and the electrode assembly (11).

The secondary sealing line (220) may form the respective predetermined intervals with the primary sealing line (13) as well as the electrode assembly (11). However, in the present invention, the term 'gap (210)' shall mean a gap between the secondary sealing line (220) and the electrode assembly (11). For example, the gap (210) has a constant interval between the secondary sealing line (220) and the electrode assembly (11), and the interval is the distance between the lower end of the secondary sealing line (220) and the upper end of the electrode assembly (11) based on FIG. 2, which may be defined based on the shortest distance between the secondary sealing line (220) and the electrode assembly (11).

The gap correction part (300) aligns the position of the pouch-type secondary battery (10) transported to the secondary sealing location to perform the correction of the gap (210) in advance.

In the present invention, the gap correction means correcting an error between a gap of a standard product (product having standard specifications) and a gap of a currently produced product. The gap of the standard product may vary depending on the product model. For example, when the gap of a standard product is 2 mm and the gap of the currently produced product is above or below 2 mm, the correction of the currently produced product to have a gap of 2 mm is referred to as gap correction.

Such a gap (210) may be adjusted by a method of adjusting the secondary sealing position of the sealing part (200), or adjusting the position of the pouch-type secondary battery (10) located in the sealing part (200).

In the present invention, the sealing part (200) is provided to perform secondary sealing at the same preset position (or fixed coordinates), and the correction of the gap (210) is performed by changing the position of the pouch-type secondary battery (10) before forming the secondary sealing line (220).

Referring to FIGS. 6A to 8C, FIGS. 6A-6C show an example in which the primary sealing line is formed asymmetrically, FIGS. 7A-7C show an example in which the electrode assembly is formed asymmetrically, and FIGS.

8A-8C show an example in which the primary sealing line and the electrode assembly are formed asymmetrically.

Referring to FIGS. 6A, 7A and 8A, the formation position of the primary sealing line (13) or the position of the electrode assembly may differ for each product (meaning a pouch-type secondary battery) due to tolerances of mechanical parts or dimensional errors of the electrode assembly, and the like. Such a difference induces error occurrence in gaps between products in the process of forming the secondary sealing line.

The gap is a factor that affects the electrical characteristics of the battery, so that when an error in the gap occurs, there is a problem that specifications between products differ. Accordingly, the secondary sealing device according to the present invention can provide products having the same specifications by performing gap correction in advance before performing secondary sealing to minimize gap errors that may occur between products.

In one example, the gap correction part (300) may comprise an image providing part (310), an image inserting part (320), an image analyzing part (330), a calculating part (340), and a driving part (350).

The image providing part (310) may provide a vertical cross-sectional image (311, 331) of the space between the primary sealing line (13) and the electrode assembly (11) (see FIGS. 6A, 7A and 8A). The vertical cross-section image is provided in a 2D form. The upper end of the vertical cross-section image (311) corresponds to the lower end of the primary sealing line (13), and the lower end of the vertical cross-section image (331) corresponds to the upper end of the electrode assembly (11).

The image inserting part (320) may insert a virtual secondary sealing line (321) into the vertical cross-section image (311, 331) at fixed coordinates (see FIGS. 6B, 7B and 8B). The virtual secondary sealing line (321) may mean a cross-sectional image of the secondary sealing line (220) really formed in the sealing part (200): the coordinates may be coordinates for the formation position of the secondary sealing line (220) really formed in the sealing part (200); and the fixed coordinates may be coordinates for the formation position of the secondary sealing line (220) in the standard product.

That is, as described above, the sealing part (200) is provided to perform the secondary sealing at the same preset position (or fixed coordinates), so that the image inserting part (320) may insert the virtual secondary sealing line (321) into the vertical cross-sectional image (311, 331) at fixed coordinates. At this time, the coordinates for the formation position of the secondary sealing line (220) are coordinates optionally settable by a use, which may be set differently for each product model.

Referring to FIGS. 3, 6B, 7B and 8B, the image analyzing part (330) may analyze gap errors in the vertical cross-sectional image (311, 331) into which the virtual secondary sealing line (321) is inserted. In the gap error, the errors are analyzed by comparing it with the gap optionally set by a user (which may vary for each required specification of the product).

The calculating part (340) may calculate a movement distance of the pouch-type secondary battery required for gap correction from the analyzed results. The calculating part (340) may calculate the movement distance of the pouch-type secondary battery by the gap error.

The driving part (350) may move the pouch-type secondary battery based on the calculated movement distance. As the pouch-type secondary battery moves through the driving part (350), the gap correction is performed between the virtual secondary sealing line (321) and the electrode assembly (11), so that a constant gap between products can be formed. The secondary sealing device according to the present invention has an advantage of facilitating gap management through the gap correction as above.

In one example, the calculating part (340) may calculate the movement distances of both ends of the pouch-type secondary battery along the longitudinal direction (1, see FIG. 1). For example, referring to FIGS. 6B, 7B and 8B, the calculating part (340) may calculate a~a' (hereinafter, ⓐ) and b~b' (hereinafter, ⓑ) distances, respectively, and calculate the movement distances (X(a), X(b)) of the pouch-type secondary battery through the standard gap (hereinafter, Y) optionally set by the user as in Equation 1 below.

$$Y = ⓐ + X(a) \qquad \text{[Equation 1]}$$

$$Y = ⓑ + X(b)$$

The X(a) is a transport distance of one end of the pouch-type secondary battery corresponding to the distance a~a' in the vertical cross-sectional image (311), and the X(b) means a transport distance of the other end of the pouch-type secondary battery corresponding to the distance b~b' in the vertical cross-sectional image (331).

That is, when the transport distances required for gap correction are each calculated through the calculating part (340), the driving part (350) can transport both ends of the pouch-type secondary battery in the longitudinal direction along the height direction (h, see FIG. 1).

In one embodiment, the driving part (350) may comprise a ball screw (351) disposed at both ends of the pouch-type secondary battery along the longitudinal direction, and a servo motor (353) that drives the ball screw (351).

The image providing part (310) may comprise a vision camera (315). The vision camera (315) may provide the vertical cross-sectional image (311, 331) based on the contrast difference.

The transport part (100) may comprise a seating part on which the pouch-type secondary battery is vertically seated so that the pouch-type secondary battery is transported in the thickness direction (t).

Referring to FIG. 5, the pouch-type secondary battery (10) is transported in an upright state in the transport part (100), and in the present application, the upright state means a state where the pouch-type secondary battery is disposed along the height direction (h) on the seating part so that the electrode assembly (11) is located at the lower part and the primary sealing line (13) is located at the upper part.

When the pouch-type secondary battery is transported in the longitudinal direction (l) or the height direction (h) of the pouch-type secondary battery, there is a disadvantage that the layout becomes long. Unlike this, referring to FIG. 5, as the transport part (100) transports the pouch-type secondary battery in the thickness (t) direction, which is shorter than the length (l) or height (h), it has an effect of minimizing the layout.

Referring to FIG. 9, the sealing part (200) is a device forming a bonding line by heating and pressurizing the rim part of the pouch-type case surrounding the electrode assembly. The sealing part (200) may comprise a support part (230) disposed to face one side of the pouch-type secondary battery (10), and a sealing pressurization part (240) disposed to face one side of the pouch-type secondary battery (10) and forming a secondary sealing line by pressurizing the other side of the pouch-type secondary battery (10) while moving toward the support part (230). The sealing pressurization part (240) is provided to heat and pressurize a region in contact with the pouch-type case. The support part (230) may be provided to heat a region in contact with the pouch-type case.

Referring to FIG. 9, similarly to the method of being transported in the transport part (100), the pouch-type secondary battery (10) is positioned in an upright state in the sealing part (200), and the sealing pressurization part (240) is provided to move toward the support part (230) along the thickness direction (t) of the pouch-type secondary battery.

In addition, the support part (230) does not move at the fixed position, and only the sealing pressurization part (240) is designed to move in a direction closer to or farther from the support part (230) along a certain moving line. Even in this instance, the moving line of the sealing pressurization part (240) is fixedly set so that the secondary sealing is equally performed at the virtual fixed coordinates.

As described above, in the sealing part (200), the pouch-type secondary battery (10) is in an upright state along the height direction (h). In this state, the driving part (350) moves both ends of the pouch-type secondary battery in the longitudinal direction (1, see FIG. 1) along the height direction (h, see FIG. 1) by a transport distance required for gap correction. As a result, the gap correction between the electrode assembly and the secondary sealing line may be performed before the secondary sealing process is performed.

In addition, the present application relates to a method of secondarily sealing a pouch-type secondary battery. The method is performed using the above-described secondary sealing device for the pouch-type secondary battery. Accordingly, descriptions overlapping with the foregoing will be omitted below.

Specifically, the secondary sealing method of the pouch-type secondary battery comprises a step of transporting a pouch-type secondary battery comprising an electrode assembly and a pouch-type case, in which a primary sealing line is formed in an electrolyte injection part located at the rim edge of the pouch-type case, to a secondary sealing location. Also, the secondary sealing method of the pouch-type secondary battery comprises a step of forming a secondary sealing line at the secondary sealing location to have a gap with the electrode assembly inside the primary sealing line. In addition, the secondary sealing method of the pouch-type secondary battery comprises a step of correcting the gap in advance by aligning the position of the pouch-type secondary battery transported to the secondary sealing location.

In one example, the step of performing the gap correction in advance comprises a step of providing a vertical cross-sectional image of the space between the primary sealing line and the electrode assembly, comprises a step of inserting a virtual secondary sealing line into the vertical cross-sectional image at fixed coordinates, comprises a step of analyzing gap errors in the vertical cross-sectional image into which the virtual secondary sealing line is inserted, comprises a step of calculating a movement distance of the pouch-type secondary battery required for gap correction from the analyzed image, and comprises a step of moving the pouch-type secondary battery based on the calculated movement distance.

The calculating step may calculate the movement distances of both ends of the pouch-type secondary battery along the longitudinal direction.

Then, the transporting step may comprise a step of vertically seating the pouch-type secondary battery so that the pouch-type secondary battery is transported in the thickness direction.

The preferred examples of the present invention as described above have been disclosed for illustrative purposes, and those skilled in the art having ordinary knowledge of the present invention will be able to make various modifications, changes, and additions within the spirit and scope of the present invention, and such modifications, changes, and additions should be regarded as falling within the scope of the following claims.

INDUSTRIAL APPLICABILITY

According to the secondary sealing device of the pouch-type secondary battery pursuant to the present invention, it aligns the position of the electrode assembly, whereby it is possible to perform correction for the gap between the electrode assembly and the secondary sealing line, and accordingly the gap management is easy, and it is possible to provide a product having the same specifications in terms of electrical characteristics.

The invention claimed is:

1. A secondary sealing device for a pouch-type secondary battery comprising an electrode assembly and a pouch-type case with a primary sealing line formed in an electrolyte injection part at a rim of the pouch-type case, the secondary sealing device comprising:

a transport part configured to transport the pouch-type secondary battery;

a sealing part configured to form a secondary sealing line between the primary sealing line and the electrode assembly, the secondary sealing line being formed at a predetermined gap from the electrode assembly; and a gap correction part configured to align a position of the pouch-type secondary battery to obtain the predetermined gap before the secondary sealing line is formed in the sealing part.

2. The secondary sealing device for a pouch-type secondary battery according to claim 1, wherein the gap correction part comprises:

an image providing part providing a vertical cross-sectional image of a space between the primary sealing line and the electrode assembly;

an image inserting part inserting a virtual secondary sealing line into the vertical cross-section image at fixed coordinates;

an image analyzing part analyzing gap errors in the vertical cross-sectional image into which the virtual secondary sealing line is inserted;

a calculating part calculating a movement distance of the pouch-type secondary battery required for gap correction from the analyzed gap errors; and a driving part configured to move the pouch-type secondary battery based on the calculated movement distance.

3. The secondary sealing device for a pouch-type secondary battery according to claim 2, wherein the calculating part calculates the moving distances of both ends of the pouch-type secondary battery along a longitudinal direction.

4. The secondary sealing device for a pouch-type secondary battery according to claim 3, wherein the driving part comprises:

a ball screw configured to be disposed at both ends of the pouch-type secondary battery along the longitudinal direction; and a servo motor that drives the ball screw.

5. The secondary sealing device for a pouch-type secondary battery according to claim 2, wherein the image providing part comprises a vision camera.

6. The secondary sealing device for a pouch-type secondary battery according to claim 1, wherein the transport part comprises a seating part configured to vertically seat the pouch-type secondary battery so that the pouch-type secondary battery is transported along a thickness direction.

7. The secondary sealing device for a pouch-type secondary battery according to claim 1, wherein the sealing part comprises:

a support part configured to face one side of the pouch-type secondary battery; and a sealing pressurization part configured to face one side of the pouch-type secondary battery and configured to form a secondary sealing line by pressurizing the other side of the pouch-type secondary battery while moving toward the support part.

8. The secondary sealing device for a pouch-type secondary battery according to claim 7, wherein the pouch-type secondary battery is configured to be positioned in an upright state in the sealing part, and the sealing pressurization part is configured to move toward the support part along the thickness direction of the pouch-type secondary battery.

9. A method of secondarily sealing a pouch-type secondary battery comprising the steps of:

transporting a pouch-type secondary battery comprising an electrode assembly and a pouch-type case to a secondary sealing location, the pouch-type secondary battery including a primary sealing line formed in an electrolyte injection part located at a rim edge of the pouch-type case, forming a secondary sealing line at the secondary sealing location to have a gap with the electrode assembly, the secondary sealing line being located between the electrode assembly and the primary sealing line; and correcting the gap in advance by aligning a position of the pouch-type secondary battery at the secondary sealing location.

10. The method of secondarily sealing a pouch-type secondary battery according to claim 9, wherein the step of performing the gap correction in advance comprises the steps of:

providing a vertical cross-sectional image of a space between the primary sealing line and the electrode assembly;

inserting a virtual secondary sealing line into the vertical cross-sectional image at fixed coordinates;

analyzing gap errors in the vertical cross-sectional image into which the virtual secondary sealing line is inserted;

calculating a movement distance of the pouch-type secondary battery required for gap correction from the analyzed gap errors; and moving the pouch-type secondary battery based on the calculated movement distance.

11. The method of secondarily sealing a pouch-type secondary battery according to claim 10, wherein the calculating step includes calculating the movement distances of both ends of the pouch-type secondary battery along a longitudinal direction.

12. The method of secondarily sealing a pouch-type secondary battery according to claim 9, wherein the transporting step comprises a step of vertically seating the pouch-type secondary battery to transport the pouch-type secondary battery along a thickness direction.

* * * * *